United States Patent [19]

Lubowitz et al.

[11] Patent Number: 4,684,714
[45] Date of Patent: Aug. 4, 1987

[54] METHOD FOR MAKING POLYIMIDE OLIGOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 781,865

[22] Filed: Sep. 30, 1985

Related U.S. Application Data

[63] Continuation-in-part of Ser. No. 536,350, Sep. 27, 1983, abandoned, which is a continuation-in-part of Ser. No. 519,394, Aug. 1, 1983, abandoned.

[51] Int. Cl.$^4$ .............................................. C08G 69/26
[52] U.S. Cl. ..................................................... 528/353
[58] Field of Search ......................................... 528/353

[56] References Cited

U.S. PATENT DOCUMENTS

| | | | |
|---|---|---|---|
| 3,563,951 | 2/1971 | Radlmann et al. | 528/172 |
| 3,658,938 | 4/1972 | Kwiatkowski et al. | 528/172 |
| 3,859,252 | 1/1975 | Cho | 528/172 |
| 3,988,374 | 10/1976 | Brode et al. | 528/172 |
| 3,993,630 | 11/1976 | Darmory et al. | 528/172 |
| 3,998,786 | 12/1976 | D'Alelio | 528/172 |
| 4,064,289 | 12/1977 | Yokoyama et al. | 528/172 |
| 4,206,106 | 6/1980 | Heilman et al. | 528/172 |
| 4,218,555 | 8/1980 | Antonoplos et al. | 528/172 |
| 4,251,417 | 2/1981 | Chow et al. | 528/172 |
| 4,251,418 | 2/1981 | Chow et al. | 528/172 |
| 4,251,419 | 2/1981 | Heilman et al. | 528/172 |
| 4,251,420 | 2/1981 | Antonoplos et al. | 528/172 |
| 4,276,407 | 6/1981 | Bilow et al. | 528/172 |
| 4,299,750 | 11/1981 | Antonoplos et al. | 528/172 |
| 4,405,770 | 9/1983 | Schoenberg et al. | 528/172 |

FOREIGN PATENT DOCUMENTS 45-09393  4/1970  Japan .................................. 528/172

Primary Examiner—Lucille M. Phynes
Attorney, Agent, or Firm—John C. Hammar

[57] ABSTRACT

Polyimide oligomers are made by the condensation of suitable anhydrides, dianhydrides, and diamines. To a chilled solution of diamine, a mixture of anhydride and dianhydride is added under an inert atmosphere. The cooling is discontinued following the mixing, and the resulting three reactant mixture is allowed to react.

18 Claims, No Drawings

METHOD FOR MAKING POLYIMIDE OLIGOMERS

REFERENCE TO RELATED APPLICATIONS

This application is a continuation-in-part application based on U.S. Ser. No. 536,350, filed Sept. 27, 1983 now abandoned, which was a continuation-in-part application based on U.S. Ser. No. 519,394, filed Aug. 1, 1983 and now abandoned.

TECHNICAL FIELD

The present invention relates to a method for making polyimide oligomers by the condensation of suitable anhydrides, dianhydrides, and diamines.

BACKGROUND ART

With the recognition that epoxy resins were too brittle for many aerospace uses, research shifted to the development of alternative resin systems. Crosslinked polysulfone polyimide oligomers, such as those disclosed in U.S. Ser. No. 536,350 (incorporated by reference), proved desirable for many aerospace uses, especially where moderate to high temperature resistance was necessary.

SUMMARY OF THE INVENTION

Polyimide oligomers for aerospace applications are prepared by the condensation of suitable diamines, anhydrides, and dianhydrides to yield solvent resistant, crosslinked composites from oligomer resins that are easily processed. Thermosetting and thermoplastic composites can be formulated by controlling the molecular weight of the oligomer. The best results are achieved by:

(a) dissolving a diamine in a suitable solvent;
(b) chilling the diamine solution;
(c) mixing together an unsaturated monoanhydride and a dianhydride;
(d) in an inert atmosphere, adding the mixed monoanhydride and dianhydride to the diamine solution while continuing to chill the diamine solution; and
(e) removing the cooling source after the addition of the mixed monoahydride and dianhydride to the diamine solution is completed.

An ice bath to chill the reactant solution cools the reactants to about 0°-5° C., and reduces the rate of reaction between the anhydride and amine reactive funtionalities. The resulting reactant mixture effectively has a uniform concentration of the reactants which leads to better control of the resulting oligomer. Once mixed, the reactants are allowed to heat up using the energy released in the reaction.

BEST MODE CONTEMPLATED FOR CARRYING OUT THE INVENTION

Polyimide oligomers suitable for aerospace applications are prepared by the condensation of suitable monoanhydrides, dianhydrides, and diamines. Preferably, the method comprises the steps of:

(a) dissolving a diamine in a suitable solvent;
(b) chilling the diamine solution with an ice bath;
(c) mixing together an unsaturated monoanhydride and a dianhydride;
(d) under an inert atmosphere, adding the mixed monoanhydride and dianhydride to the diamine solution while continuing to chill the diamine solution with an ice bath; and
(e) removing the ice bath after the addition of the mixed monoanhydride and dianhydride to the diamine solution is completed.

By initially cooling the reactants and by adding the mono- and dianhydride simultaneously from a premixed solution, the reaction rate is decreased and reaction control is improved. The diamine is exposed to a substantially constant concentration of mono- and dianhydride, so the likelihood of premature chain termination occurring is reduced. Local discontinuities in the monoanhydride concentration result in undesired termination reactions, and control of the molecular weight of the resulting oligomers is lost.

The monoanhydride is used as a crosslinking end cap for the oligomer, comprises about two moles of the resulting mixture, and is preferably selected from the group of compounds consisting of:

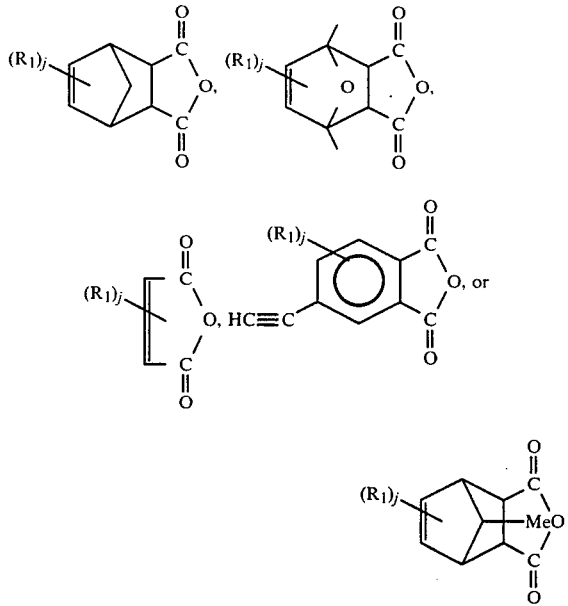

wherein
$R_1$ = lower alkyl, lower alkoxy, aryl, aryloxy, substituted aryl, halogen, or mixtures thereof; and
$j$ = 0, 1, or 2.

The diamine generally is a polyaryl moiety including a phenoxyphenyl sulfone linkage, and comprises about $n+1$ moles of the resulting mixture. The diamine is terminated at one end with a monoanhydride, and reacts with the dianhydride at the other amino group to form a polyaryl backbone with imide linkages. "Sulfone" linkages within the backbone function as swivels which impart the desired physical properties to the oligomers. For purposes of this application, "sulfone" is used in a generic way to include $-SO_2-$ (sulfone), $-CO-$ (carbonyl), $-S-$ (sulfide), and $-(CF_3)_2C-$ (hexafluoroisopropanyl) linkages. Phenoxyphenyl sulfones of the formula:

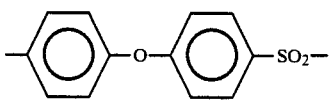

are preferred.

The diamine is preferably selected from the group consisting of:

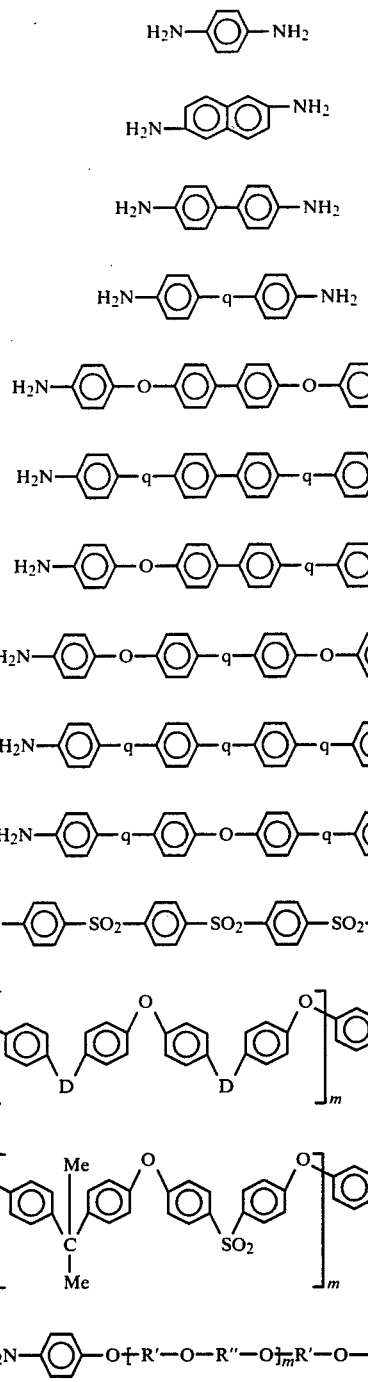

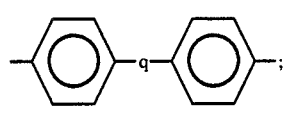

wherein
R' =

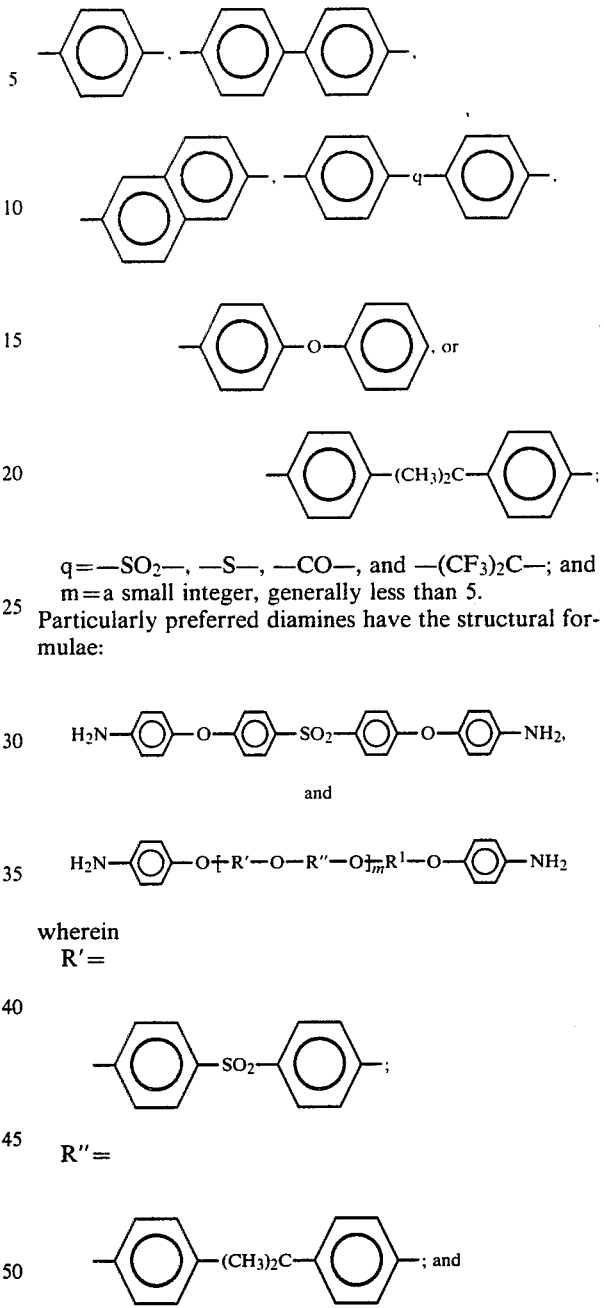

$q = -SO_2-, -S-, -CO-,$ and $-(CF_3)_2C-$; and
$m =$ a small integer, generally less than 5.

Particularly preferred diamines have the structural formulae:

$H_2N-\bigcirc-O-\bigcirc-SO_2-\bigcirc-O-\bigcirc-NH_2,$ and $H_2N-\bigcirc-O+R'-O-R''-O\}_mR'-O-\bigcirc-NH_2$ wherein
R' =

$-\bigcirc-SO_2-\bigcirc-;$

R'' =

$-\bigcirc-(CH_3)_2C-\bigcirc-;$ and $m = 0$ or $1$.

Although the para isomer has been illustrated, other isomers for the chains might also be used. The aryl group may include substituents such as halogen, alkyl groups having 1-4 carbon atoms, alkoxy groups having 1-4 carbon atoms, or aryl. Steric hindrance may arise in synthesizing the oligomers or in crosslinking the oligomers into the final composites if the side chains are too large. The substituents may also effect the thermal stability of the resulting oligomers and composites. Unsubstituted phenyl groups are preferred for cost, convenience, and performance.

Molecular weights for the diamines can be varied from about 500-2000 to achieve suitable oligomers. Using lower molecular weight diamines enhances the mechanical properties of the resulting oligomers.

The dianhydride is generally selected from the group consisting of pyromellitic dianhydride, benzophenone-tetracarboxylic dianhydride (BTDA), and 5-(2,5-diketotetrahydrofuryl-3-methyl-3-cyclohexene-1,2-dicarboxylic anhydride (MCTC).

Preferably the resulting oligomers have thermosetting properties achievable by controlling the molecular weight. These oligomers have molecular weights between about 800–5000; more preferably, 1000–4000; and, most preferably, 1000–3000.

Prepregs of the oligomers can be prepared by dissolving the oligomers in a suitable solvent along with a suitable amount of phenylenediamine, benzidine, or 4,4'-methylene dianiline to achieve the desired flowability of the oligomer onto the fabric. The prepregs may be cured by a conventional vacuum bag technique at about 350°–650° F. depending upon the end cap used.

The invention is probably best illustrated with reference to the following examples:

EXAMPLE 1

Step 1 Synthesis of imide of 3-nitrophthalic anhydride and p-aminophenol

In a 300 ml flask equipped with stirrer, condenser, thermometer, and dry $N_2$ purge, a solution of 10.91 g p-aminophenol in 31.0 g N,N-dimethyl formamide was charged. While cooling the mixture in an ice bath, a solution of 19.31 g 3-nitrophthalic anhydride in 20.0 N,N-dimethyl formamide was gradually added. The mixture was stirred for 15 minutes, then 24.5 g acetic anhydride (0.2 moles plus 20% molar excess) and 2.45 g sodium acetate were added. The mixture was heated to 70° C. and maintained for 3 hours. After cooling, the product was recovered by filtration, and had a melting range of approximately 197°–198° C.

Step 2 Synthesis of phenoxyphenyl sulfone diamine

A one liter bottle fitted with a stirrer, thermometer, Barrett trap, condenser, and nitrogen inlet was charged with 85.27 g (0.30 moles) of the product obtained from step 1, 43.07 g (0.15 moles) 4,4'-dichlorodiphenyl sulfone, 359.4 g N,N-dimethyl acetamide, 154.0 g toluene, and 22.80 g (0.165 moles) potassium carbonate (100M). The mixture was refluxed for about 64 hours, before the temperature was raised to 165° C. and maintained for another two hours. After cooling, the reaction mixture was blended with water in a Waring blender to form a precipitate that was filtered, washed with water, and dried. The dried material was placed in a N,N-dimethyl acetamide and saponified using sodiumhydroxide. The phenoxyphenyl sulfone diamine was recovered by blending the mixture with a 1% sodium sulfite solution in a Waring blender to form a precipitate, which has a melting point of about 191° C.

Those skilled in the art will recognize the generic nature of this synthetic mechanism for the preparation of suitable diamines for use in the method of the present invention.

EXAMPLE 2

Synthesis of dimethyl oxynadic anhydride

To a stirred suspension of 39.2 g (0.4 mole) of maleic anhydride in 39 ml of dry ether, under an inert gas blanket, 38.4 g (0.4 mole) of 2,5-dimethyl furan was slowly added. The mixture was stored for about 3 hours, during which time the adduct began to precipitate. Cooling the mixture in a dry ice-acetone bath resulted in further precipitation of the adduct, which was collected by filtration, rinsed with chilled ether, and dried.

EXAMPLE 3

Synthesis of polyimide

In a reaction flask, fitted with a stirrer, condenser, thermometer, and dry $N_2$ purge a 60% slurry of 31.39 g (0.072 moles) of the phenoxyphenyl sulfone diamine made in Example 1 was charged in 20.93 g 2-methoxyethyl ether. The flask was placed in an ice bath, and a 10% solution of mixed anhydrides: 14.94 g dimethyl oxynadic anhydride (0.077 moles) [the product of Example 2] and 6.28 g, MCTC (0.034 moles) in 190.97 g 2 methoxyethyl ether was gradually added. The mixture was stirred for 15 minutes, and the flask was removed from the ice bath and stirred 2 hours at ambient temperature. The product was recovered by filtration.

Those skilled in the art will recognize the generality of this synthetic mechanism for preparing polyimides.

While a preferred embodiment has been described, those skilled in the art will readily recognize alterations, variations, or modifications which might be made without departing from the inventive concept. The examples are meant to illustrate the invention and are not intended to limit it. This description and the accompanying claims should be construed liberally to protect the invention, and the claims should be limited only as is necessary in view of the pertinent prior art.

We claim:

1. A method of making polyimide oligomers, comprising the steps of:
   (a) dissolving a diamine in a suitable solvent;
   (b) chilling the diamine solution;
   (c) mixing together an unsaturated monoanhydride and a dianhydride to form a premix;
   (d) in an inert atmosphere, adding the premix to the diamine solution while continuing to chill the diamine solution; and
   (e) removing the cooling source after the addition of the premix to the diamine solution is completed.

2. The method of claim 1 wherein the cooling source is an ice bath.

3. The method of claim 2 wherein the oligomer is thermosetting and has a molecular weight of between about 800–5,000.

4. The method of claim 1 wherein the ratio of monoanhydride:dianhydride:diamine in the mixed solution is about 2:n:n+1 moles, wherein n equals a small integer.

5. The method of claim 1 wherein the diamine is selected from the group consisting of:

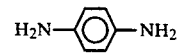

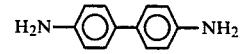

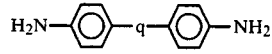

-continued

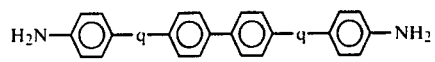

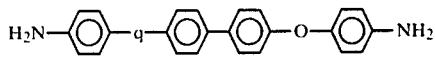

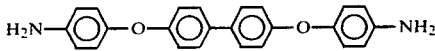

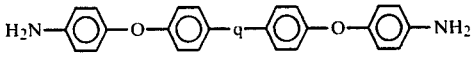

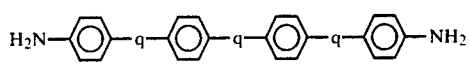

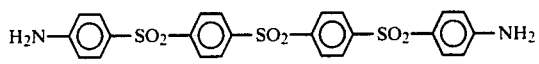

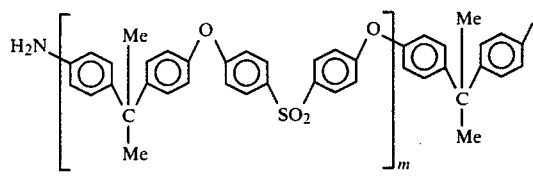

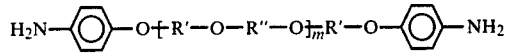

wherein
R' =

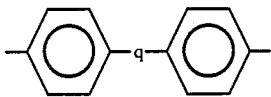

R'' =

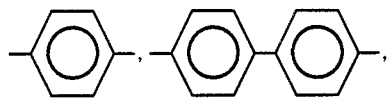

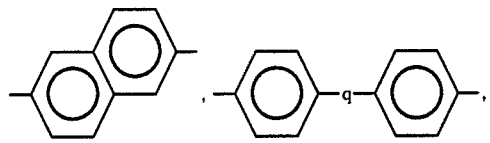

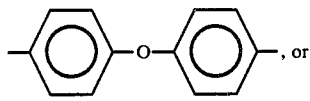, or

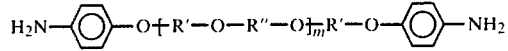

q = —SO$_2$—, —S—, —CO—, or —(CF$_3$)$_2$C—; and m = a small integer, generally less than 5.

6. The method of claim 5 wherein the diamine is selected from the group consisting of:

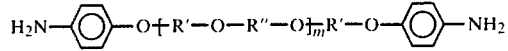

wherein
R' =

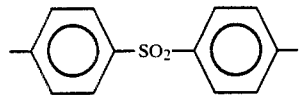

R'' =

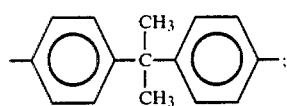

and
m = 0 or 1.

7. The method of claim 1 wherein the monoanhydride is selected from the group consisting of:

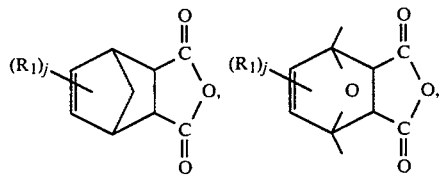

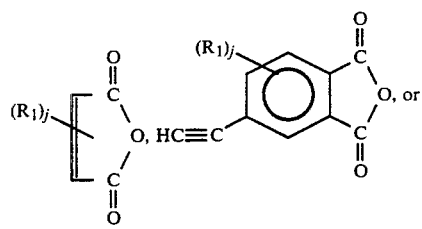

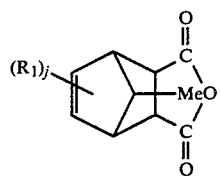

wherein
R$_1$ = lower alkyl, lower alkoxy, aryl, aryloxy, substituted aryl, halogen, or mixtures thereof; and
j = 0, 1, or 2.

8. The method of claim 5 wherein the monoanhydride is selected from the group consisting of:

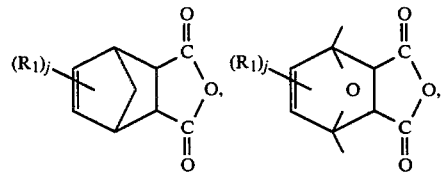

-continued

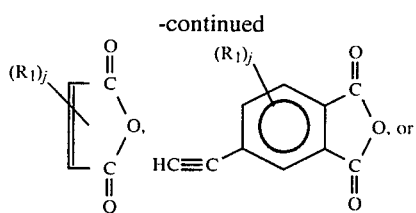

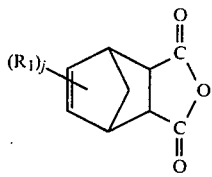

wherein
R₁ = lower alkyl, lower alkoxy, aryl, aryloxy, substituted aryl, halogen, or mixtures thereof; and
j = 0, 1, or 2.

9. The method of claim 1 wherein the dianhydride is selected from the group consisting of pyromellitic dianhydride, benzophenonetetracarboxylic dianhydride (BTDA), 5-(2,5-diketotetrahydrofuryl-3-methyl-3-cyclohexene-1,2-dicarboxylic anhydride (MCTC), and mixtures thereof.

10. The method of claim 5 wherein the dianhydride is selected from the group consisting of pyromellitic dianhydride, benzophenonetetracarboxylic dianhydride (BTDA), 5-(2,5-diketotetrahydrofuryl-3-methyl-3-cyclohexene-1,2-dicarboxylic anhydride (MCTC), and mixtures thereof.

11. The method of claim 8 wherein the dianhydride is selected from the group consisting of pyromellitic dianhydride, benzophenonetetracarboxylic dianhydride (BTDA), 5-(2,5-diketotetrahydrofuryl-3-methyl-3-cyclohexene-1,2-dicarboxylic anhydride (MCTC), and mixtures thereof.

12. A method of making polyimide oligomers, comprising the steps of:
(a) dissolving n+1 moles of a diamine in a suitable solvent, the diamine being selected from the group consisting of:

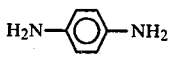

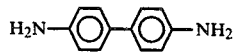

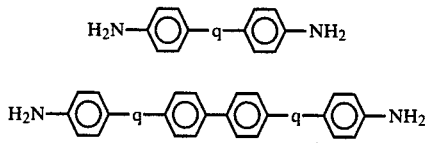

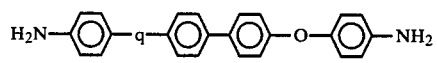

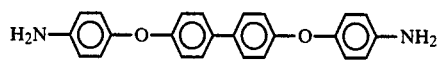

-continued

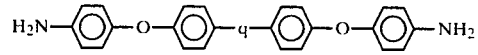

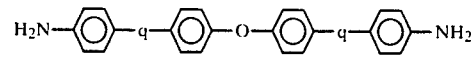

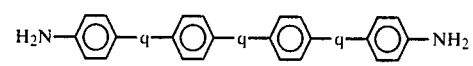

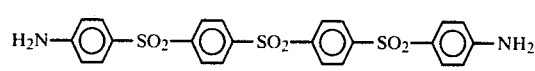

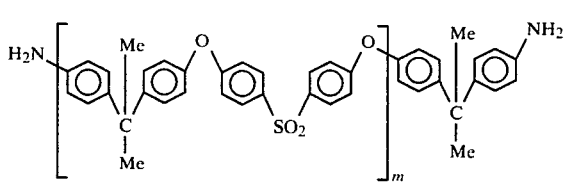

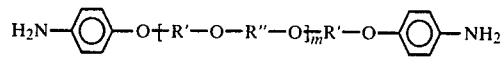

wherein
R' =

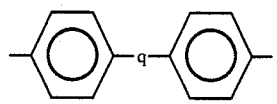

R" =

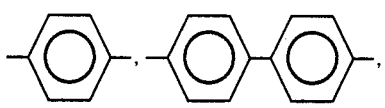

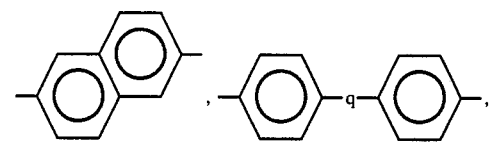

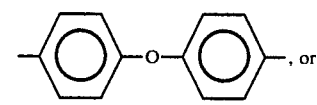

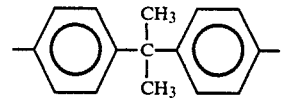

q = —SO₂—, —S—, —CO—, or —(CF₃)₂C—; and
m = a small integer, generally less than 5;
(b) chilling the diamine solution to about 0°–5° C.;
(c) mixing together about 2 moles of an unsaturated monoanhydride selected from the group consisting of:

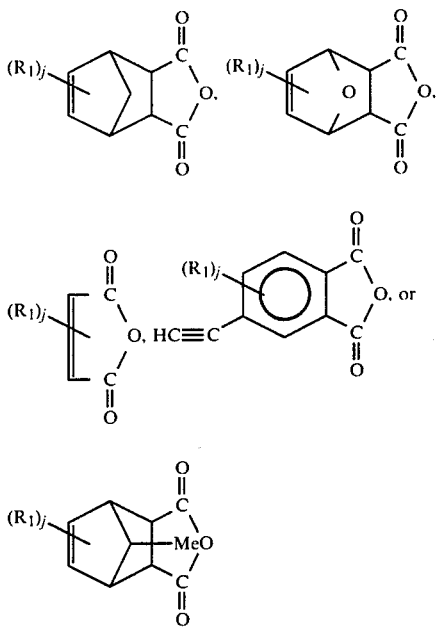

wherein
$R_1$ = lower alkyl, lower alkoxy, aryl, aryloxy, substituted aryl, halogen, or mixtures thereof; and
$j$ = 0, 1, or 2
and n moles of a dianhydride selected from the group consisting of pyromellitic dianhydride, or benzophenonetetracarboxylic dianhydride (BTDA), 5-(2,5-diketotetrahydrofuryl-3-methyl-3-cyclohexene-1,2-dicarboxylic anhydride (MCTC)
(d) in an inert atmosphere, adding the mixed monoanhydride and dianhydride to the chilled diamine solution while continuing to chill the diamine solution; and
(e) removing the cooling source after addition of the mixed monoanhydride and dianhydride to the diamine solution is completed.

13. The method of claim 12 wherein the cooling source is an ice bath.

14. The method of claim 12 wherein the diamine is selected from the group consisting of:

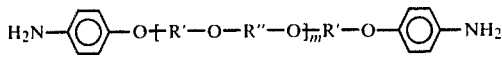

wherein
$R'$ =

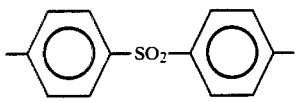

$R''$ =

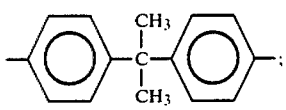

and
$m$ = 0 or 1.

15. The product of the process of claim 12.
16. The product of the process of claim 14.
17. The product of the process of claim 4.
18. The product of claim 17 wherein the oligomer is thermosetting and has a molecular weight of between about 800–5,000.

* * * * *